United States Patent
Hu et al.

(10) Patent No.: US 9,798,843 B2
(45) Date of Patent: Oct. 24, 2017

(54) STATISTICAL TIMING USING MACRO-MODEL CONSIDERING STATISTICAL TIMING VALUE ENTRY

(71) Applicant: International Business Machines Corporation, Armonk, NY (US)

(72) Inventors: Jin Hu, Wappingers Falls, NY (US); SheshaShayee K. Raghunathan, Bangalore (IN); Debjit Sinha, Wappingers Falls, NY (US); Vladimir P. Zolotov, Putnam Valley, NY (US)

(73) Assignee: International Business Machines Corporation, Armonk, NY (US)

(*) Notice: Subject to any disclaimer, the term of this patent is extended or adjusted under 35 U.S.C. 154(b) by 180 days.

(21) Appl. No.: 14/800,059

(22) Filed: Jul. 15, 2015

(65) Prior Publication Data
US 2017/0017743 A1    Jan. 19, 2017

(51) Int. Cl.
G06F 9/455 (2006.01)
G06F 17/50 (2006.01)

(52) U.S. Cl.
CPC .................... *G06F 17/5031* (2013.01)

(58) Field of Classification Search
USPC ........................................ 716/113
See application file for complete search history.

(56) References Cited

U.S. PATENT DOCUMENTS 8,086,976 B2   12/2011   Hemmett et al.
8,122,404 B2    2/2012   Sinha et al.

OTHER PUBLICATIONS

Visweswariah et al. "First-Order Incremental Block-Based Statistical Timing Analysis", Aug. 21, 2006, IEEE, IEEE Transactions on Computer-Aided Design of Integrated Circuits and Systems vol. 25, Issue: 10, pp. 2170-2180.*

* cited by examiner

*Primary Examiner* — Bryce Aisaka
(74) *Attorney, Agent, or Firm* — Steven J. Meyers; Hoffman Warnick LLC

(57) ABSTRACT

A statistical timing analysis using statistical timing macro-models considering statistical timing value entries such as input slew and output load is disclosed. That statistical timing analysis calculates a statistical timing quantity based on statistical timing value entries based on a statistical timing (ST) macro-model of a selected macro of an integrated circuit (IC) design that includes statistical timing quantities as a function of deterministic timing value entries.

20 Claims, 7 Drawing Sheets

FIG. 1 (PRIOR ART)

| | $I_1$ | $I_2$ | ... | $I_m$ |
|---|---|---|---|---|
| $s_{in,1}$ | $D_{11}$ | $D_{12}$ | ... | $D_{1m}$ |
| $s_{in,2}$ | $D_{21}$ | $D_{22}$ | ... | $D_{2m}$ |
| ... | ... | ... | ... | ... |
| $s_{in,n}$ | $D_{n1}$ | $D_{n2}$ | ... | $D_{nm}$ |

FIG. 2 (PRIOR ART)

| | $I_1$ | $I_2$ | ... | $I_m$ |
|---|---|---|---|---|
| $s_{in,1}$ | $s_{out,11}$ | $s_{out,12}$ | ... | $s_{out,1m}$ |
| $s_{in,2}$ | $s_{out,21}$ | $s_{out,22}$ | ... | $s_{out,2m}$ |
| ... | ... | ... | ... | ... |
| $s_{in,n}$ | $s_{out,n1}$ | $s_{out,n2}$ | ... | $s_{out,nm}$ |

FIG. 3 (PRIOR ART)

| Input slew and/or Output load | Delay | Output slew |
|---|---|---|
| $s_{in,1}, I_1$ | $D_{11}$ | $s_{out,11}$ |
| $s_{in,2}, I_1$ | $D_{21}$ | $s_{out,21}$ |
| ... | ... | ... |
| $s_{in,n}, I_1$ | $D_{n1}$ | $s_{out,n1}$ |
| $s_{in,1}, I_2$ | $D_{12}$ | $s_{out,12}$ |
| $s_{in,2}, I_2$ | $D_{22}$ | $s_{out,22}$ |
| ... | ... | ... |
| $s_{in,(n-1)}, I_m$ | $D_{(n-1)m}$ | $s_{out,(n-1)m}$ |
| $s_{in,n}, I_m$ | $D_{nm}$ | $s_{out,nm}$ |

| Entry ($S_{in}$) | Mean delay $\mu$ | Linear sens. to $X_1$ | Linear sens. to $X_2$ | ... | Cross-term sens. to $X_1$, $X_2$ | Cross-term sens. to $X_1$, $X_3$ | ... | Cross-term sens. to $X_i$, $X_j$ |
|---|---|---|---|---|---|---|---|---|
| $s_{in,1}$ | $\mu_1$ | $\alpha_{1,1}$ | $\alpha_{1,2}$ | ... | $\alpha_{1,12}$ | $\alpha_{1,13}$ | ... | $\alpha_{1,ij}$ |
| $s_{in,2}$ | $\mu_2$ | $\alpha_{2,1}$ | $\alpha_{2,2}$ | ... | $\alpha_{2,12}$ | $\alpha_{2,13}$ | ... | $\alpha_{2,ij}$ |
| ... | ... | ... | ... | ... | ... | ... | ... | ... |
| $s_{in,n}$ | $\mu_n$ | $\alpha_{n,1}$ | $\alpha_{n,2}$ | ... | $\alpha_{n,12}$ | $\alpha_{n,13}$ | ... | $\alpha_{n,ij}$ |

FIG. 5

| | Load $l_1$ | Load $l_2$ | ⋮ |
|---|---|---|---|
| $s_{in,1}$ | $\mu_{11}$ | $\mu_{12}$ | ⋮ |
| $s_{in,2}$ | $\mu_{21}$ | $\mu_{22}$ | ⋮ |
| ⋮ | ⋮ | ⋮ | ⋮ |

FIG. 7

| | Load $l_1$ | Load $l_2$ | ⋮ |
|---|---|---|---|
| $s_{in,1}$ | $\alpha_{11,i}$ | $\alpha_{12,i}$ | ⋮ |
| $s_{in,2}$ | $\alpha_{21,i}$ | $\alpha_{22,i}$ | ⋮ |
| ⋮ | ⋮ | ⋮ | ⋮ |

FIG. 8

| | Load $l_1$ | Load $l_2$ | ⋮ |
|---|---|---|---|
| $s_{in,1}$ | $\alpha_{11,ij}$ | $\alpha_{12,ij}$ | ⋮ |
| $s_{in,2}$ | $\alpha_{21,ij}$ | $\alpha_{22,ij}$ | ⋮ |
| ⋮ | ⋮ | ⋮ | ⋮ |

FIG. 9

STATISTICAL TIMING USING MACRO-MODEL CONSIDERING STATISTICAL TIMING VALUE ENTRY

BACKGROUND

Technical Field

The present disclosure relates to statistical timing analysis of integrated circuit designs, and more specifically, to statistical timing analysis using statistical-timing macro-models while considering statistical timing value entries such as statistical input slew and statistical output load.

Related Art

Static timing analysis (STA) is used to compute the expected timing of a digital circuit to identify problem areas of an integrated circuit during the design phase and in advance of actual fabrication. Timing runs in STA simulate the timing of the integrated circuit to determine whether or not the integrated circuit meets various timing constraints and, therefore, is likely to operate properly if fabricated in accordance with the tested design.

Deterministic static timing analysis (DSTA) propagates timing value entries, such as arrival times (ATs), required arrival times (RATs), and slews, along with any other timing related quantities (guard times, adjusts, asserts, slacks, etc.), in a timing graph as single valued deterministic data. DSTA covers a single corner of a space of process variations with each individual timing run. A corner represents a particular combination of input values for a parameter that may include temperature of the circuit, input voltage, and various manufacturing parameters of an integrated circuit. To evaluate the impact that a given parameter will have on timing, multiple DSTA timing runs must be executed with parameters that affect timing set at several maximum and minimum corners, such as high and low temperature, high and low voltages, and various processing conditions. For example, DSTA timing runs may compare a worst case corner characterized by a combination of high input voltage, a high operating temperature, and the worst manufacturing parameters with a best case corner characterized by a combination of a low input voltage, a low operating temperature, and the best manufacturing parameters.

Timing values are computed for a timing graph at each node based upon the ATs, which define the time (or the time distribution) at which a given signal arrives at a timing point, and the RATs, which defines the time (or the time distribution) at which the signal is required to get to the timing point, in order to meet the timing requirements. These ATs and RATs are used to compute timing metrics in the form of slacks at nodes (RAT minus AT for late mode and AT minus RAT for early mode). A negative value for either a late mode slack or an early mode slack indicates a timing constraint violation. As a check of the performance of the integrated circuit design, DSTA timing runs may examine many or all of the corners and the IC design may be iteratively adjusted until all of the corners pass the timing tests. These results reflect the extreme performance bounds of the integrated circuit and may require numerous timing runs to fully explore the space of process variations. Even then, the results may be overly pessimistic and misleading for optimization tools.

Statistical static timing analysis (SSTA) propagates timing value entries as random variables with known probability distribution functions, or their approximation, instead of as single valued deterministic data under DTSA. SSTA may calculate a result, for example, a delay and/or output slew, for the propagated statistical distribution functions of input slew and (output) load. A single timing run using block-based SSTA predicts the performance of the integrated circuit over the entire space of process variations. In contrast, a single timing run using DSTA merely predicts a single corner of the space of process variations. Consequently, in order to close timing, a single SSTA timing run may replace multiple DSTA timing runs. For example, assuming the existence of N parameters (i.e., variables or sources of variation) and two corners per parameter, $2^N$ corners would have to be individually analyzed by discrete DSTA timing runs to match the effectiveness of a single SSTA run. Hence, SSTA is far more computationally efficient than DSTA.

A test run that passes in a single process corner under a DSTA timing run may actually fail without detection in one or more other performance-limiting corners in the process space, which a SSTA timing run would reveal. SSTA also reduces pessimism as a result of the statistical techniques inherent in this approach. For example, the propagation of known independently random terms in SSTA allows for taking the square root of the sum of the squares of random quantities (RSSing) between each propagation state, rather than straight summation as in DTSA. Other pessimism relief may occur when sampling the final distributions, as additional RSSing may occur between terms during projection from a distribution to some example sample value. Finally, information regarding the probability of particular failure modes may be obtained in SSTA, as opposed to DSTA that merely indicates a binary pass/fail condition. SSTA may allow for very low probability fails to be ignored while also allowing for a more aggressive clipping of the statistical tails when used with at-speed tests.

With increasing significance of variability in the chip design and manufacturing process, SSTA is increasingly employed during IC design finalization. Variability can include any parameter that can change how integrated circuit performs. Examples of variability include fabrication process variability such as line width; operational variability such as internal temperature or voltage; environmental variability such as external temperature; etc. For large designs, timing is typically carried out in a hierarchal manner, e.g., evaluating multi-core chips, multi-unit cores, and then multi-macro units. Parts of the timing methodology may include, for example, transistor or gate level timing of macros, timing abstraction (macro-modeling) and gate level timing at parent levels of hierarchy (e.g., unit, core, chip). To handle large designs, design partitions (e.g., macros, units) are designed and timed in isolation ("out of context") and then abstracted (macro-modeled). These macro-models are subsequently used at the parent level of hierarchy. In order to capture the impact of variability in these macro-models, statistical macro-modeling (statistical abstraction) is performed. Statistical timing macro-models contain timing information (like statistical delays, statistical output-slews, statistical test-margins, etc.) which are often stored as lookup-tables as a function of inputs such as deterministic input-slew and deterministic output-load samples. For example, where values of an input slew (s) at a point A in an integrated circuit and a particular output load (l) at point B in an IC are both deterministic, a look up table of the corresponding statistical delay D(s,l) can be easily calculated. In this setting, the statistical delay D(s,l) for deterministic input-slew (s) and deterministic output load (l) can be represented by the equation:

$$D(s, l) = \mu(s, l) + \sum_{i=1}^{N} a_i(s, l)X_i + \sum_{i=1}^{N-1}\sum_{j=i+1}^{N} a_{ij}(s, l)X_iX_j \quad \text{Equation A}$$

where $\mu(s,l)$ represents a nominal value of the delay (D) which denotes the value of delay in the absence of any variations; $a_i(s,l)$ represents an intrinsic linear timing sensitivity of delay due to a single source of variation $X_i$; $a_{ij}(s,l)$ represents a cross-term timing sensitivity of delay due to sources of variation $X_i$ and $X_j$; and N is the number of sources of variation. In a deterministic model, each of the above values can be calculated and provided in simple look up tables. A statistical timing quantity can be projected to a deterministic value by assigning a numeric corner value for each source of variation $X_i$. As an example, if all sources of variation except $X_k$ are at their base corner values (denoted by $B_i$ for $X_i$), and $X_k$ is at a non-corner value $O_k$, the projected value of D is given by:

$$\mu(s, l) + \sum_{i=1, i \neq k}^{N} a_i(s, l)B_i + a_k(s, l)O_k + \quad \text{Equation B}$$

$$\sum_{i=1, i \neq k}^{N-1}\sum_{j=i+1, j \neq k}^{N} a_{ij}(s, l)B_iB_j + \sum_{j=k+1}^{N} a_{kj}O_kB_j.$$

If the base corner for each source of variation is assumed to be 0, the projected value of D is given by:

$$\mu(s,l)+a_k(s,l)O_k. \quad \text{Equation C}$$

A challenge with the conventional deterministic approach is that timing value entries, such as input-slew and output-load, are variability dependent. In other words, they can be considered a statistical distribution. For example, the fact that an output load is fabrication process, voltage, temperature (PVT) dependent indicates that loads can be modeled in a statistical fashion. Consequently, statistical timing value entries such as input slews and output loads introduce a new dimension of complexity in statistical macro-modeling. While traditional deterministic macro-models contain deterministic timing quantities (e.g., delays, output-slews, etc.) as a lookup table of deterministic timing value entries like input-slew and/or load, it is unclear if statistical macro-models should have lookup tables as a function of deterministic timing value entries (e.g., deterministic input-slew and deterministic output-loads) or statistical timing value entries (e.g., statistical input-slew and statistical output-loads). While the latter is the seemingly more proper method, it increases the lookup table size enormously (distribution inputs and distribution outputs) and, therefore, can be impractical for use. On the other hand, if, for example, the statistical macro-model lookup tables are characterized using deterministic timing value entries (slews and/or loads), it is important to model the impact of the input-slew's and load's variability when the macro-model is used at the parent level of hierarchy. Based on the complexity of the statistical calculation of the illustrative timing value entries, it becomes very difficult to determine a statistical timing quantity result such as delay.

A simple approach to the above-described challenge is to use the mean value (or some projected value of the given statistical input slew $S_{in}$ and statistical load L) to get a deterministic input-slew and load, and then use these values for table-lookup in a statistical timing macro-model. However, this approach is inaccurate and can cause significant timing inaccuracy. An alternate approach is to expand the statistical macro-model into multiple deterministic macro-models at different corners of variability, and use the various deterministic macro-models for statistical timing using finite-differencing. While this latter approach has no conceptual loss in accuracy, it causes undesired run-time increases. For example, current solutions to the variability aware macro-modeling include generating multiple deterministic models at different conditions (or corners) of variability. This approach suffers from "corner explosion"; that is, the need to close timing at too many corners, which is inefficient and may delay a chip's time to market in comparison with statistical timing based IC design finalization.

SUMMARY

A first aspect of the invention is directed to a method of performing statistical timing analysis of a selected macro of an integrated circuit (IC) design using a statistical timing (ST) macro-model of the selected macro, the ST macro-model including statistical timing quantities as a function of deterministic timing value entries, each statistical timing quantity including a mean average contribution, and at least one of a linear sensitivity contribution and a cross-term sensitivity contribution, the method comprising: calculating a statistical timing quantity considering at least a given statistical timing value entry for the selected macro by: A) calculating a mean value contribution to the statistical timing quantity based on the mean average contributions of all statistical timing value entries from the ST macro-model of the selected macro, B) calculating a cumulative linear sensitivity contribution to the statistical timing quantity for each of at least one linear variation source by summing a result of the following for each of the at least one variation source: first calculating a first projected value of at least one statistical timing value entry at a non-base corner of a selected linear variation source with all other linear variation sources at a respective base corner, and second calculating the linear sensitivity contribution to the statistical timing quantity for the selected linear variation source based on: a mean average contribution for the first projected value of the at least one statistical timing value entry from the ST macro-model, an intrinsic linear sensitivity for the first projected value for the selected linear variation from the ST macro-model and the mean value contribution to the statistical timing quantity; C) first summing the mean value contribution and the cumulative linear sensitivity contribution to calculate the statistical timing quantity; and using the statistical timing quantity for statistical timing analysis and designing the IC.

A second aspect of the invention includes a system for performing statistical timing analysis of a selected macro of an integrated circuit (IC) design using a statistical timing (ST) macro-model of the selected macro, the ST macro-model including statistical timing quantities as a function of deterministic timing value entries, each statistical timing quantity including a mean average contribution, and at least one of a linear sensitivity contribution and a cross-term sensitivity contribution, the system comprising: a calculator calculating a statistical timing quantity considering at least a given statistical timing value entry for the selected macro by: A) calculating a mean value contribution to the statistical timing quantity based on the mean average contributions of all statistical timing value entries from the ST macro-model of the selected macro, B) calculating a cumulative linear sensitivity contribution to the statistical timing quantity for each of at least one linear variation source by summing a result of the following for each of the at least one variation source: first calculating a first projected value of at least one statistical timing value entry at a non-base corner of a selected linear variation source with all other linear variation sources at a respective base corner, and second calculating the linear sensitivity contribution to the statistical timing quantity for the selected linear variation source based on: a mean average contribution for the first projected value of the at least one statistical timing value entry from the ST macro-model, an intrinsic linear sensitivity for the first projected value for the selected linear variation from the ST macro-model and the mean value contribution to the statistical timing quantity; C) first summing the mean value contribution and the cumulative linear sensitivity contribution to calculate the statistical timing quantity; and an IC design system using the statistical timing quantity for designing the IC.

A third aspect of the invention related to a computer program product for performing statistical timing analysis of a selected macro of an integrated circuit (IC) design using a statistical timing (ST) macro-model of the selected macro, the ST macro-model including statistical timing quantities as a function of deterministic timing value entries, each statistical timing quantity including a mean average contribution, and at least one of a linear sensitivity contribution and a cross-term sensitivity contribution, the computer program product comprising a computer readable storage medium having program instructions embodied therewith, the program instructions executable by a processor to cause the processor to perform the following steps: calculating a statistical timing quantity considering at least a given statistical timing value entry for the selected macro by: A) calculating a mean value contribution to the statistical timing quantity based on the mean average contributions of all statistical timing value entries from the ST macro-model of the selected macro, B) calculating a cumulative linear sensitivity contribution to the statistical timing quantity for each of at least one linear variation source by summing a result of the following for each of the at least one variation source: first calculating a first projected value of at least one statistical timing value entry at a non-base corner of a selected linear variation source with all other linear variation sources at a respective base corner, and second calculating the linear sensitivity contribution to the statistical timing quantity for the selected linear variation source based on: a mean average contribution for the first projected value of the at least one statistical timing value entry from the ST macro-model, an intrinsic linear sensitivity for the first projected value for the selected linear variation from the ST macro-model and the mean value contribution to the statistical timing quantity; C) first summing the mean value contribution and the cumulative linear sensitivity contribution to calculate the statistical timing quantity; and an IC design system using the statistical timing quantity for designing the IC.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein:

FIG. 1 shows a schematic, conventional look-up table of statistical delay (D) as a function of deterministic input slew ($s_{in}$, leftmost column) and deterministic load (l, top row).

FIG. 2 shows a schematic, conventional look-up table of statistical output slew ($S_{out}$) as a function of deterministic input slew ($s_{in}$, leftmost column) and deterministic load (l, top row).

FIG. 3 shows a schematic, conventional look-up table combining data of FIGS. 1 and 2.

FIG. 5 shows a schematic look-up table representing various contributions to a statistical delay as a function of deterministic input slew ($s_{in}$, leftmost column) according to embodiments of the disclosure.

FIG. 7 shows a schematic look-up table including mean average contributions µ of delay to a statistical delay as a function of deterministic input slew ($s_{in}$, leftmost column) and deterministic load (l, top row) according to embodiments of the disclosure.

FIG. 8 shows a schematic look-up table including linear sensitivity contributions $\alpha_i$ to a statistical delay corresponding to a source of variation $X_i$ as a function of deterministic input slew ($s_{in}$, leftmost column) and deterministic load (l, top row) according to embodiments of the disclosure.

FIG. 9 shows a schematic look-up table including cross-term sensitivity contributions $\alpha_{ij}$ to a statistical delay corresponding to sources of variation $X_i$ and $X_j$ as a function of deterministic input slew ($s_{in}$, leftmost column) and deterministic load (l, top row) according to embodiments of the disclosure.

DETAILED DESCRIPTION

Figure 4:
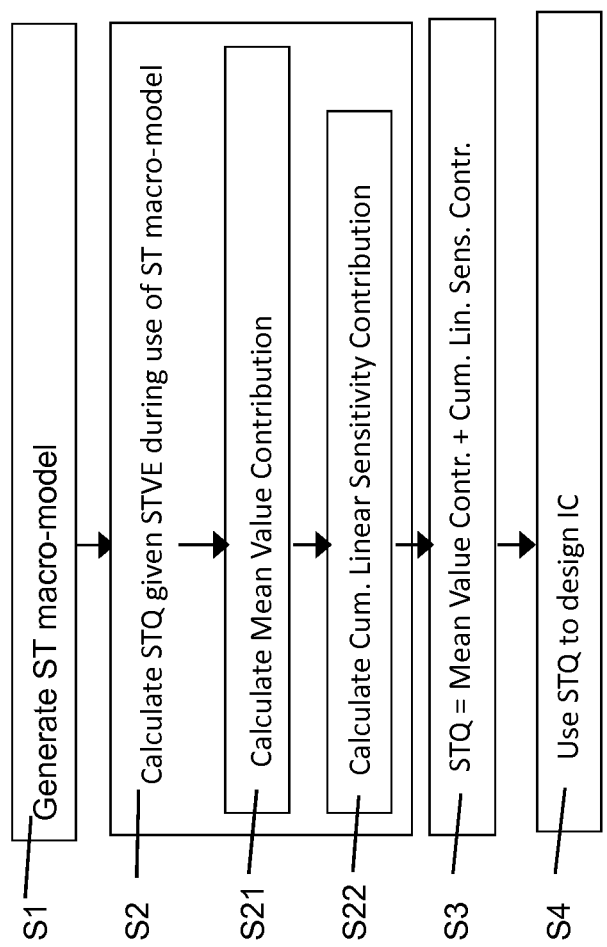
FIG. 4 shows a flow diagram illustrating a method according to embodiments of the disclosure.

Embodiments of the disclosure teach a method, system and program product to create a statistical timing model that is statistical timing value entry aware, and also teaches how to use the model in the presence of statistical timing value variability. As described herein, "statistical timing value entry" may include any parameter that impacts timing of the integrated circuit design such as but not limited to input slew, output load, test guard-times, adjusts, asserts, etc. For purposes of ease of description, the disclosure will refer mainly to use of input slew ($S_{in}$) and/or output load (L) as the statistical timing value entries. Embodiments of the disclosure also teach to capture the nominal value of all timing information as lookup tables, as well as the sensitivities of all timing quantities as lookup tables characterized as functions of deterministic timing value entries, e.g., slew and load. It further teaches a method to use these lookup tables in an efficient fashion during the use of the statistical macro-model in presence of at least a given statistical timing value entry (e.g., statistical input slew and statistical load) to dynamically compute statistical timing quantities (statistical delay, statistical output slew, statistical test guard-time) from the model.

Introduction:

In conventional approaches, a statistical timing (ST) macro-model may have results/outputs such as the statistical delay and statistical output slew stored as a look-up table as a function of deterministic timing value entries such as deterministic input slew and deterministic load. An ST macro-model may be formed for any number of segments of the IC, referred to as "macros." FIG. 1 shows a schematic of a conventional ST macro-model look-up table of statistical timing result in the form of delay (D) as a function of deterministic input slew ($s_{in}$, leftmost column) and deterministic load (l, top row). FIG. 2 shows a similar schematic, conventional ST macro-model look-up table of statistical output slew ($S_{out}$) as a function of deterministic input slew ($s_{in}$, leftmost column) and deterministic load (l, top row). The two tables may be combined into a combination table as illustrated in FIG. 3. As observed, given a deterministic input-slew $s_{in}$ and a deterministic load l, when using the ST macro-model, it is trivial to look-up in the table(s) for the segment's corresponding results: statistical delay D and statistical output-slew $S_{out}$.

In a statistical timing environment, however, the inputs may not be in a deterministic, i.e., single value, form and may be in a statistical, or distributed, format. In this case, computing the correct result such as statistical delay and output-slew given: (1) a statistical timing value entry(ies): input-slew and statistical load, i.e., in the form of a distribution, and (2) a statistical-timing model which has data (lookup table based) as a function of deterministic slew and deterministic load, is non-trivial.

Methodology:

A method of performing a statistical timing analysis using macro-models considering statistical timing value entries such as input slew and output load will now be described. Referring to FIG. 4, a flow diagram of a methodology according to embodiments of the disclosure is illustrated.

In a first step S1, a conventional ST macro-model is generated for a selected macro of an IC design. The step can be carried out in a conventional fashion, creating a statistical timing quantity (output) such as delay based on one or more deterministic, i.e., single value, timing value entries such as input slew or load for multiple timing segments in the selected macro. For purposes of description, a statistical timing analysis output may take a variety of forms, such as the afore-mentioned, output slew $S_{out}$ and/or delay D. Hereinafter, for purposes of description, any statistical timing analysis output shall be referred to as a "statistical timing quantity" (STQ).

FIG. 5 shows statistical ST macro-model look up table including STQ contributors for nominal or mean average contribution of delay ($\mu_1$-$\mu_n$) corresponding to single deterministic timing value entry of input slew ($S_{in,1}$-$S_{in,n}$). In contrast to the collective representation of data shown in FIG. 3, FIG. 5 shows a look-up table representation of the contributing values of the STQs in FIG. 3. That is, as indicated, each statistical timing quantity, e.g., delay (shown in FIG. 5) or output slew, includes a number of contributing values. Each STQ in FIG. 3 hence includes: a nominal or mean average contribution (for delay $\mu_1$-$\mu_n$), an intrinsic linear sensitivity ($\alpha_{1,i}$-$\alpha_{n,i}$) corresponding to each source of linear variation $X_i$, and a cross-term sensitivity ($\alpha_{1,ij}$-$\alpha_{n,ij}$) corresponding to each pair of linear variation sources $X_i$ and $X_j$. A similar look up table can be formed for other single timing value entries such as load. The contribution of a random sensitivity is implicit in this model and hence not described separately. The data in FIG. 5 can also be configured as shown in FIG. 6, in which the ST macro-model look up table provides STQs based on two deterministic timing value entries of input slew ($s_{in,1}$-$S_{in,n}$) and load ($l_1$-$l_m$).

Figure 6:
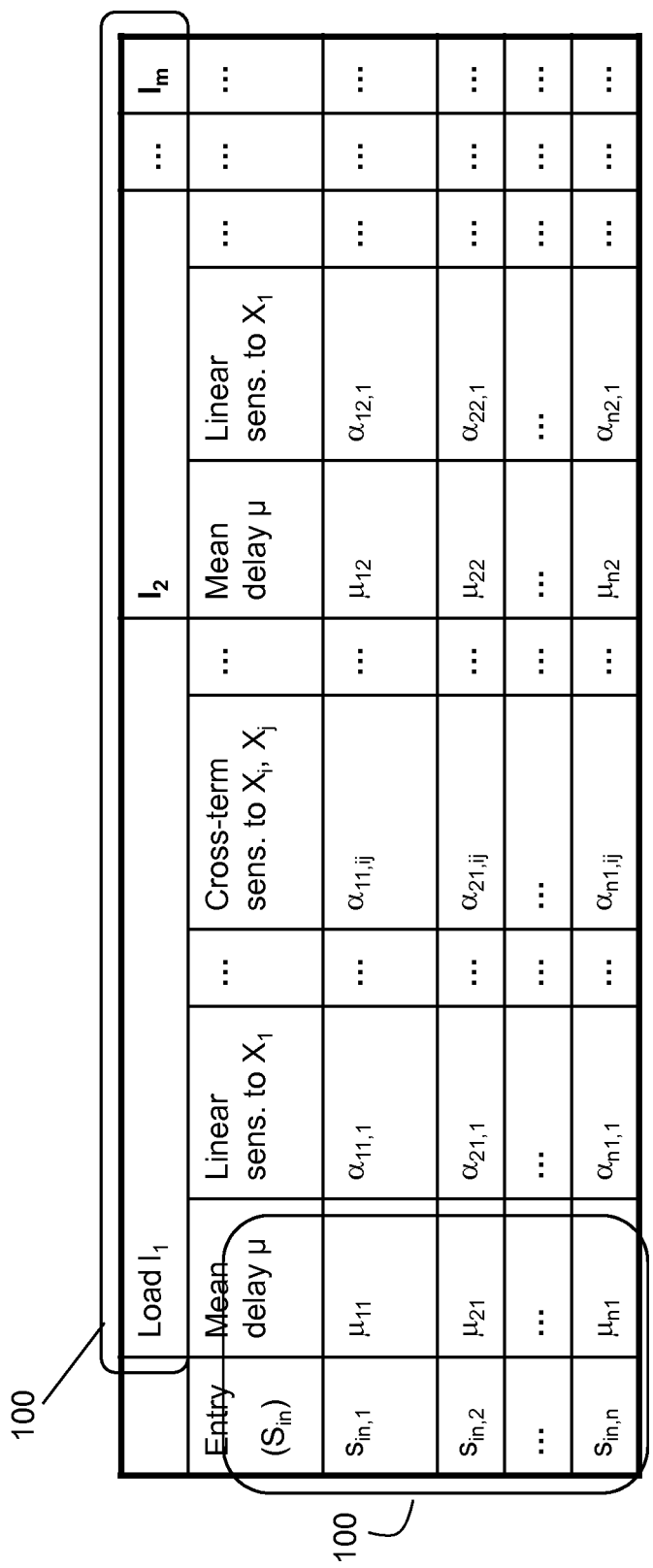
FIG. 6 shows a schematic look-up table including various contributions to a statistical delay as a function of deterministic input slew ($s_{in}$, leftmost column) and deterministic load (l, top row) according to embodiments of the disclosure.

As an alternative, each value from the tables of FIGS. 5 and 6 can be provided in its own particular look up table. For example, FIG. 7 shows the mean average contribution of delay ($\mu$ in FIGS. 5 and 6) for two timing value entries of input slew ($s_{in,1}$, $s_{in,2}$, ...) and load ($l_1$, $l_2$, ...); FIG. 8 shows the linear sensitivities ($\alpha_i$) to a linear variation source $X_i$ for two timing value entries of input slew ($s_{in,1}$, $s_{in,2}$, ...) and load ($l_1$, $l_2$, ...); and FIG. 9 shows cross-term sensitivities ($\alpha_{ij}$) to a pair of linear variation sources $X_i$ and $X_j$ for two timing value entries of input slew ($s_{in,1}$, $s_{in,2}$, ...) and load ($l_1$, $l_2$, ...). There could be N tables, one for each variation source $X_i$ (i=1, 2, ..., N) for linear sensitivities $\alpha_i$, and N*(N−1) tables, one for each cross-term sensitivity $\alpha_{ij}$. Any form of look up table may be employed. It is also emphasized that the statistical macro-model may not have an explicit look up table, but functions that return STQ values based on given deterministic timing value entries. Such functions can be considered some form of look up tables. The values from each table can be retrieved and then used according to embodiments of the disclosure.

The disclosure describes embodiments wherein a small number of efficient projections are performed for the STVEs to obtain deterministic values which are then used for looking up the ST macro-model to obtain contributions for constructing an STQ. This process avoids explicit conversion of the ST macro-model to multi-corner deterministic macro-models, the latter of which can be finite-differenced to create a STQ at a higher run-time penalty.

In step S2 (FIG. 4), an STQ is calculated considering at least a given statistical timing value entry (STVE) for the selected macro. The given statistical timing value entry can be any value(s) for the selected macro whose statistical timing needs to be calculated. Embodiments of the disclosure may apply to single statistical timing value entries (e.g., load, input slew alone), or combinations thereof. Step S2 includes a number of sub-steps to calculate the STQ. According to embodiments of the disclosure, STVEs input slew (S) and load (L) may be represented in the following manner:

$$S = s_* + \sum_{i=1}^{N} \delta_i X_i + \sum_{i=1}^{N-1} \sum_{j=i+1}^{N} \delta_{ij} X_i X_j \qquad \text{Equation 1}$$

$$L = l_* + \sum_{i=1}^{N} \lambda_i X_i + \sum_{i=1}^{N-1} \sum_{j=i+1}^{N} \lambda_{ij} X_i X_j \qquad \text{Equation 2}$$

In the above equations, $s_*$, $l_*$ represent nominal or mean values of the particular statistical timing value entry; $\delta_i$ and $\lambda_i$ represent linear sensitivities as a function of a single linear variation source $X_i$ for the particular entry; $\delta_{ij}$ and $\lambda_{ij}$ represent cross-term sensitivities as a function of pairs of cross-term linear variation sources $X_i$ and $X_j$ for the particular entry; and N is the number of sources of variation.

For purposes of description, an STQ may take a variety of forms, such as the afore-mentioned, output slew $S_{out}$, or delay D, or test guard-time G. Based on the above equations, according to embodiments of the disclosure, a statistical timing quantity (STQ, output) may be represented as:

$$STQ = \mu(s_*, l_*) + \sum_{i=1}^{N} a_i X_i + \sum_{i=1}^{N-1} \sum_{j=i+1}^{N} a_{ij} X_i X_j \quad \text{Equation 3}$$

where:

$\mu(s_*, l_*)$ represents a mean value contribution of the statistical timing quantity such as delay (D) or output slew ($S_{out}$);

$a_i$ represents a linear timing value sensitivity (hereinafter simply "linear sensitivity") as a function of a single linear variation source $X_i$ that considers the variability in all STVEs as well;

$a_{ij}$ represents a cross-term timing value sensitivity (hereinafter simply "cross-term sensitivity") as a function of a pair of cross-term variation sources $X_i$ and $X_j$; and N is the number of sources of variability.

Single sources of linear variations ($X_i$) can include any parameter that can change how the integrated circuit performs such as: fabrication process variability such as line width; operational variability such as internal temperature or voltage; environmental variability such as external temperature; etc. Cross-term variations may include a combination of any of the sources of variation such as line width and voltage, external temperature and internal temperature, etc. Where STQ is a test guard-time G, the given statistical timing value entry may include at least one of an input slew at the data end of the test and an input slew at the clock end of the test.

In another embodiment, only the first two terms of Equation 3 may be employed to calculate the STQ. In this case, the equation reduces to:

$$STQ = \mu(s_*, l_*) + \sum_{i=1}^{N} a_i X_i \quad \text{Equation 4}$$

where:

$\mu(s_*, l_*)$ represents a mean value contribution for STQ corresponding to the mean average contributions of all given STVEs ($s_*, l_*$) retrieved from the ST macro-model;

$a_i$ represents a linear sensitivity as a function of a single linear variation source $X_i$; and N is the number of sources of variability.

Returning to FIG. 4, step S2 employs the described equations to calculate an STQ during use of a ST macro-model considering at least one given STVE. Step S2 includes a number of sub-steps which will be described relative to the ST macro-model examples illustrated in the look-up tables of FIGS. 5 and 6.

In sub-step S21, a mean value contribution $\mu(s_*, l_*)$ to the STQ is calculated based on the mean average contributions of all statistical timing value entries from the ST macro-model of the selected macro. In one embodiment, the mean value contribution $\mu(s_*, l_*)$ calculating includes assigning the mean value contribution as the mean average contribution $\mu$ from the ST macro-model corresponding to a mean average of all of the statistical timing value entries from the ST macro-model of the selected macro. As an example, from Equation 1 and Equation 2, the mean values of the statistical slew and statistical load STVE are $s_*$ and $l_*$, respectively. The mean average contribution $\mu$ in the lookup table (as shown in FIG. 7) is then queried with the deterministic values for $s_*$ and $l_*$ to obtain the mean value contribution to the STQ. If the $s_*$ and $l_*$ values match an entry in the look up table, for example, if $s_{in,2}$ equals $s_*$, and $l_2$ equals $l_*$, the mean value contribution to the STQ would be $\mu_{22}$. When the STVE values do not match those in the look up table exactly, interpolation or extrapolation may be performed to obtain the result.

Sub-step S22 (FIG. 4) includes calculating a cumulative linear sensitivity contribution to the STQ for each of at least one linear variation source $X_i$. In one embodiment of the invention, the linear sensitivity $a_i$ for each of at least one linear variation source $X_i$ can be calculated according to the following equation. It is noted that the description that follows references a combined ST macro-model including two statistical timing value entries, input slew s and load l, as in the example in FIG. 6.

$$a_i = \frac{\mu(s_i, l_i) - \mu(s_*, l_*)}{O_i} + \alpha_i(s_i, l_i) \quad \text{Equation 5}$$

where:

$a_i$ represents a linear sensitivity for a selected linear variation source $X_i$;

$s_i, l_i$ represent a first projected value of statistical timing value entries slew and load, respectively, at a non-base corner of the selected linear variation source $X_i$ with all other variation sources at their respective base corners. In this embodiment, the base corner value for all variation sources is considered to be 0, and $O_i$ denotes a non-base corner value for selected linear variation source $X_i$. From Equation 1 and Equation 2, the first projected values $s_i, l_i$ of the STVEs may be calculated as:

$$s_i = s_* + \delta_i O_i \quad \text{Equation 6}$$

$$l_i = l_* + \lambda_i O_i \quad \text{Equation 7}$$

where, again, $s_*$ and $l_*$ are mean values of the statistical slew and statistical load STVE; and $\delta_i$ and $\lambda_i$ represent linear sensitivities as a function of a single source of linear variations $X_i$ for the particular entry.

Continuing with the components of Equation 5:

$\mu(s_i, l_i)$ represents a mean average contribution corresponding to the first projected values ($s_i, l_i$) of statistical value entries retrieved from the ST macro-model;

$\mu(s_*, l_*)$ represents a mean value contribution for STQ corresponding to the mean average contributions of all given STVEs ($s_*, l_*$) retrieved from the ST macro-model, as calculated in sub-step S21; and $\alpha_i(s_i, l_i)$ represents an intrinsic linear sensitivity for first projected value ($s_i, l_i$) of selected linear variation source $X_i$ from ST macro-model, as shown in FIG. 8.

Linear sensitivity $a_i$ is a sensitivity of the STQ to linear variation source $X_i$, i.e., if linear variation source $X_i$ changes by some value, STQ changes by the change in the linear variation source $X_i$ times the linear sensitivity $a_i$. The product $a_i X_i$ is referred to herein as a linear sensitivity contribution for each linear variation source. Each linear sensitivity contribution for each variation source can be calculated similarly, and then summed to arrive at a cumulative linear sensitivity contribution to the STQ. That is, $$\sum_{i=1}^{N} a_i X_i.$$

To further explain Equation 5 textually, a number of calculating steps are performed. A first calculating may include calculating a first projected value $(s_i, l_i)$ of at least one STVE at a non-base corner of a selected linear variation source $X_i$ with all other linear variation sources at a respective base corner, per Equations 6 and 7. That is, according to Equations 6 and 7, the first projected value $(s_i, l_i)$ is calculated as the sum of: a product of the non-base corner value $O_i$ and linear sensitivity(ies) as a function of the selected linear variation source $X_i$ for the particular STVE ($\delta_i$ or $\lambda_i$) and a mean value of the STVE (statistical slew or statistical load) for the selected linear variation source $X_i$. Two STVEs may used: input slew $S_{in}$ and load L, or the same calculation can be performed for one STVE such as input slew alone or more than two STVEs. A second calculating may include, per Equation 5, calculating the linear sensitivity $a_i$ to the STQ for the selected linear variation source $X_i$ based on: a mean average contribution $\mu(s_i, l_i)$ for the first projected value $(s_i, l_i)$ of the at least one STVE from the ST macro-model, an intrinsic linear sensitivity $\alpha_i(s_i, l_i)$ for the first projected value $(s_i, l_i)$ for the selected linear variation $X_i$ from the ST macro-model and the mean value contribution $\mu(s_*, l_*)$ to the statistical timing quantity. More particularly, the second calculating of the linear sensitivity contribution may include: calculating the linear sensitivity $a_i$ to the STQ for the selected linear variation source $X_i$ as the sum of: a) a dividend of a difference of the mean average contribution $\mu(s_i, l_i)$ for the first projected value $(s_i, l_i)$ of the STVE from the ST macro-model (FIG. 6) and the mean value contribution $\mu(s_*, l_*)$ to the STQ divided by a non-base corner $O_i$ of the linear sensitivity contribution at the corner value of the selected linear variation source $X_i$, and b) the intrinsic linear sensitivity $\alpha_i(s_i, l_i)$ for the first projected value $(s_i, l_i)$ for the selected linear variation $X_i$ from the ST macro-model. These two components in the second calculation denote: a) the contribution of variability from the STVE(s) towards the STQ, and b) the intrinsic variability of the ST macro-model towards the STQ in the absence of STVE variability, respectively. Accounting for the variability from both the STVE(s) and the ST macro-model enables calculating the STQ accurately.

Continuing with FIG. 4, in one embodiment per Equation 4, in step S3, STQ is calculated as the sum of the mean value contribution $\mu_0(s_*, l_*)$ and the cumulative linear sensitivity contribution from all sources of variation, i.e., as $$\sum_{i=1}^{N} a_i X_i.$$

Figure 11:
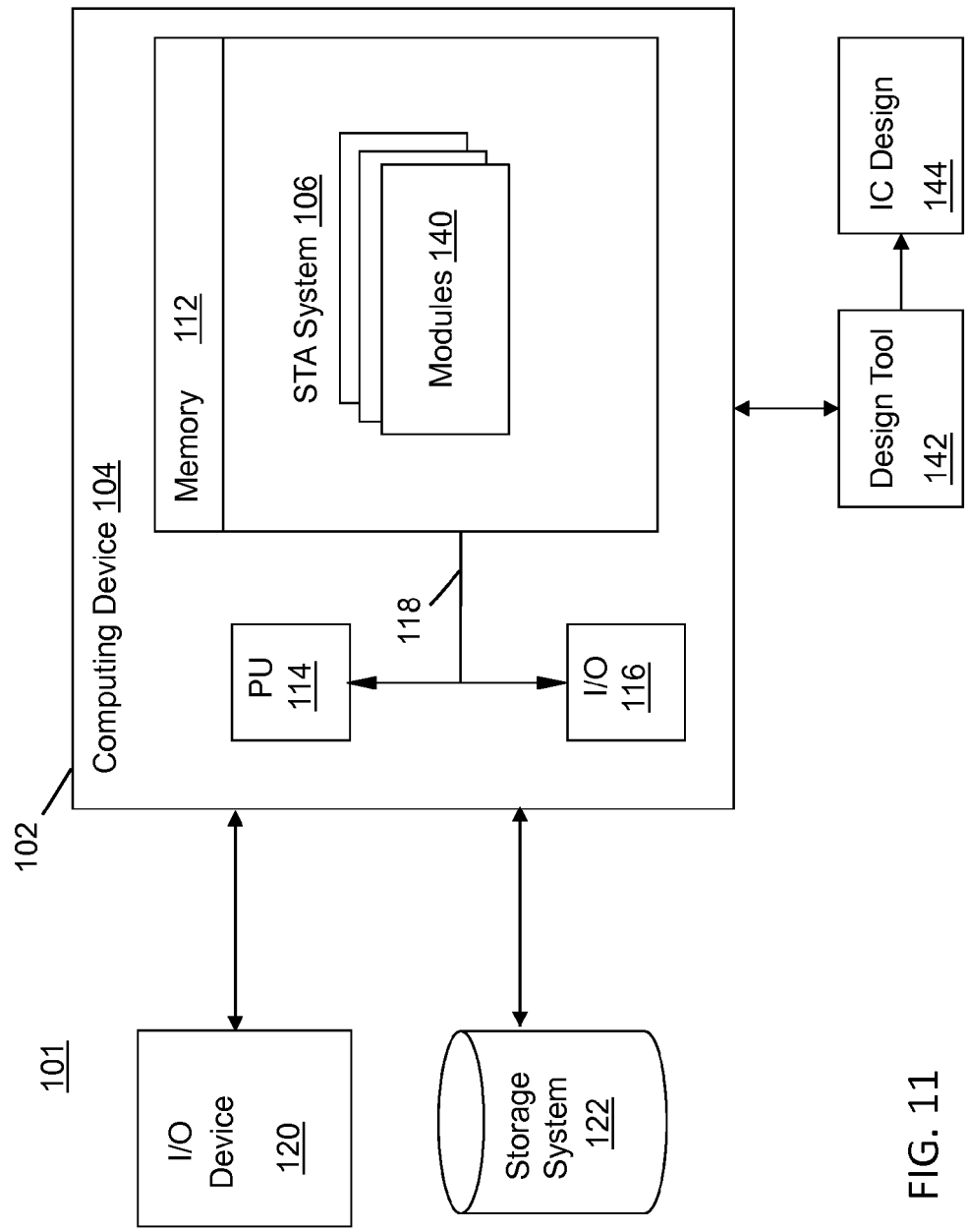
FIG. 11 shows a block diagram illustrating a system for carrying out methods according to embodiments of the disclosure.

In step S4, the STQ is used for designing the IC, e.g., in a design tool 142 (FIG. 11). The use of the STQ may be according to any now known or later developed processes for laying out, configuring, manipulating a design for an IC in electronic form. As understood in the art, a design process for building an application specific IC (ASIC) will differ from a design process for designing a standard component. In any event, the IC design is an input to a design process and may come from an IP provider, a core developer, or other design company. The IC design may comprise a circuit in the form of schematics or a hardware-description language (HDL) (e.g., Verilog, VHDL, C, etc.), or may be in one or more machine readable formats. For example, the IC design may be a text file or a graphical representation of a circuit. The design process synthesizes (or translates) the circuit into a netlist, where the netlist is, for example, a list of interconnects, transistors, logic gates, control circuits, I/O, models, etc. and describes the connections to other elements and circuits in an integrated circuit design and recorded on at least one machine readable medium.

Figure 10:
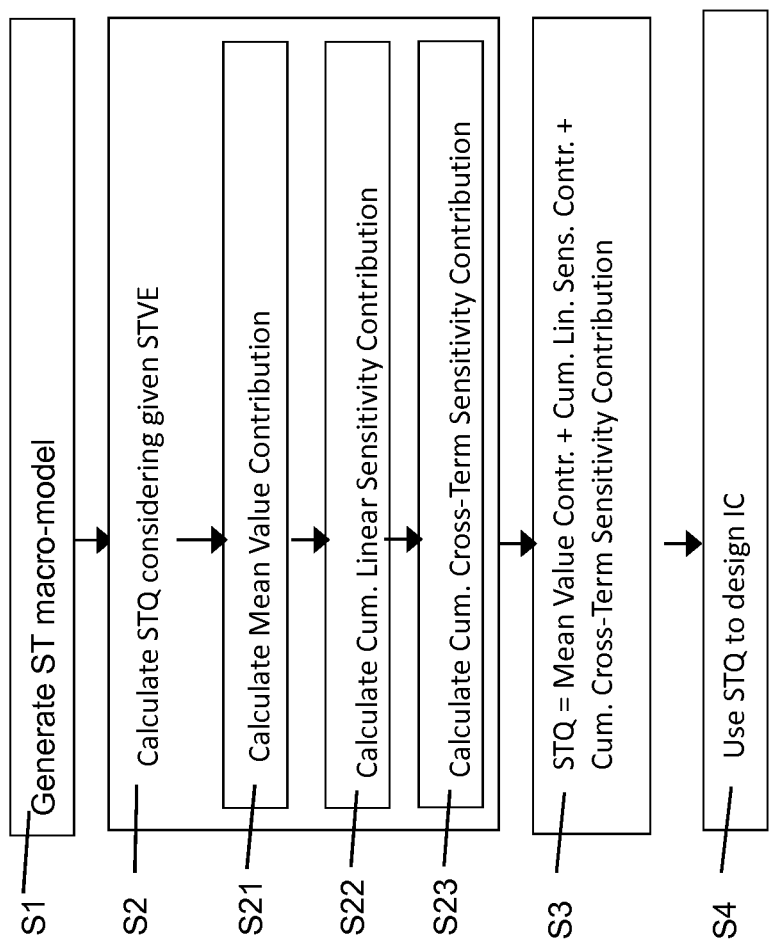
FIG. 10 shows a flow diagram illustrating a method according to other embodiments of the disclosure.

Referring to FIG. 10, in an alternative embodiment, STQ may be calculated per Equation 3. The process of FIG. 10 is substantially identical to that of FIG. 4, except that cumulative cross-term sensitivity contribution $$\sum_{i=1}^{N-1} \sum_{j=i+1}^{N} a_{ij} X_i X_j$$

(per Equation 3) is also calculated for inclusion in the STQ. Here, a cross-term sensitivity contribution is calculated for each of at least one pair of cross-term variation sources $X_i$ and $X_j$, and each are summed to calculate a cumulative cross-term sensitivity contribution in the STQ. FIG. 10 includes sub-step S23 which includes calculating a cumulative cross-term sensitivity contribution to the STQ. The cumulative cross-term sensitivity contribution improves the accuracy of a typical linear STQ which assumes each source of variation is independent of the others. The cross-term sensitivity $a_{ij}$ defines the change in sensitivity of source of variation $X_i$ per unit variation of source of variation $X_j$. In one embodiment of the disclosure, a cross-term sensitivity can be calculated according to the following equation. It is noted that the description that follows references a combined ST macro-model including two statistical timing value entries, input slew $S_{in}$ and load L, as in the example in FIG. 6.

$$a_{ij} = \frac{\mu(s_{ij}, l_{ij}) - \mu(s_*, l_*)}{O_i * O_j} + \frac{\alpha_i(s_{ij}, l_{ij})}{O_j} + \frac{\alpha_j(s_{ij}, l_{ij})}{O_i} + \alpha_{ij}(s_{ij}, l_{ij}) - \frac{a_i}{O_j} - \frac{a_j}{O_i} \quad \text{Equation 8}$$

where:

$a_{ij}$ represents a cross-term sensitivity to STQ for each of at least one pair of variation sources $X_i$ and $X_j$;

$(s_{ij}, l_{ij})$ represents a second projected value of statistical timing value entries slew and load, respectively, at non-base corners of the selected pair of linear variation sources $X_i$ and $X_j$ with all other variation sources at their respective base corners. In this embodiment, the base corner value for all variation sources is considered to be 0, and $O_i$ and $O_j$ denote a pair of non-base corner values for $X_i$ and $X_j$, respectively. From Equation 1 and Equation 2, the second projected values of the STVEs are calculated as:

$$s_{ij} = s_* + \delta_i O_i + \delta_j O_j + \delta_{ij} O_i O_j \quad \text{Equation 9}$$

$$l_{ij} = l_* + \lambda_i O_i + \lambda_j O_j + \lambda_{ij} O_i O_j \quad \text{Equation 10;}$$

where, again, $s_*$ and $l_*$ are mean values of the statistical slew and statistical load STVE; $\delta_i$ and $\lambda_i$ represent linear sensitivities as a function of a single source of linear variations $X_i$ for the particular entry, and $\delta_{ij}$ and $\lambda_{ij}$ represent linear cross-term sensitivities as a function of a pair of sources of variation $X_i$ and $X_j$ for the particular entry.

Continuing with the components of Equation 8:

$\mu(s_{ij}, l_{ij})$ represents a mean average contribution corresponding to the second projected value $(s_{ij}, l_{ij})$ of statistical value entries, retrieved from the ST macro-model;

μ(s*, l*) represents a mean value contribution for STQ corresponding to the mean average contributions of all given STVEs (s*, l*), retrieved from the ST macro-model, as calculated in sub-step S21;

$\alpha_i(s_{ij}, l_{ij})$ represents an intrinsic linear sensitivity for first variation source $X_i$ of selected pair of cross term variation at second projected value $(s_{ij}, l_{ij})$, retrieved from ST macro-model, as shown in FIG. 8;

$\alpha_j(s_{ij}, l_{ij})$ represents an intrinsic linear sensitivity for second variation source $X_j$ of selected pair of cross term variation at second projected value $(s_{ij}, l_{ij})$, retrieved from ST macro-model, as shown in FIG. 8;

$\alpha_{ij}(s_{ij}, l_{ij})$ represents an intrinsic cross-term sensitivity of selected pair $(X_i, X_j)$ of cross-term variation at second projected value $(s_{ij}, l_{ij})$, retrieved from ST macro-model, as shown in FIG. 9;

$a_i$ represents a linear sensitivity of first variation source $X_i$ of selected pair of cross-term variation sources computed as shown in Equation 6; and $a_j$ represents a linear sensitivity of second variation source $X_j$ of selected pair of cross-term variation source computed similar to as shown in Equation 6.

To further explain Equation 8 textually, a number of calculating steps are performed. A (third) calculating includes calculating a second projected value $(s_{ij}, l_{ij})$ of at least one STVE (here input slew $S_{in}$ and load L) at non-base corners of a pair of selected cross-term variation sources $X_i$ and $X_j$ with all other cross-term variation sources at a respective base corner, as shown in Equation 9 and Equation 10.

Another (fourth) calculating may include calculating a cross-term sensitivity $a_{ij}$ for the selected pair of cross-term variation sources $X_i$ and $X_j$ as:

a) the sum of:
i) a dividend of a difference of a mean average contribution $\mu(s_{ij}, l_{ij})$ for the second projected value $(s_{ij}, l_{ij})$ retrieved from the ST macro-model and the mean value contribution $\mu(s*, l*)$ to the STQ divided by a product of non-base corner values $O_i$ and $O_j$ of each of the first variation source $X_i$ and the second variation source $X_j$ of the selected pair of cross-term variation sources,
ii) a dividend of the intrinsic linear sensitivity of the first variation source $\alpha_i(s_{ij}, l_{ij})$ of the selected pair of cross-term variation sources at the second projected value $(s_{ij}, l_{ij})$, from the ST macro-model divided by a non-base corner value of the second variation source $O_j$ at the second projected value $(s_{ij}, l_{ij})$,
iii) a dividend of the intrinsic linear sensitivity of the second variation source $\alpha_j(s_{ij}, l_{ij})$ of the selected pair of cross-term variation sources at the second projected value $(s_{ij}, l_{ij})$, from the ST macro-model divided by a non-base corner value of the first variation source $O_i$ at the second projected value $(s_{ij}, l_{ij})$, and
iv) an intrinsic cross-term sensitivity $\alpha_{ij}(s_{ij}, l_{ij})$ of the pair of cross-term variation sources at the second projected value $(s_{ij}, l_{ij})$, retrieved from the ST macro-model;

b) minus:
i) a dividend of the linear sensitivity of the first linear variation source $a_i$ of the selected pair of cross-term variation sources from the ST macro-model (calculated in sub-step S22) divided by the non-base corner value of the second variation source $O_j$ at the second projected value $(s_{ij}, l_{ij})$, and
ii) a dividend of the linear sensitivity of the second linear variation source $a_j$ of the selected pair of cross-term variation sources from the ST macro-model (calculated in sub-sep S22) divided by the non-base corner of the first variation source $O_i$ at the second projected value) $(s_{ij}, l_{ij})$. The above steps a) and b) except step iv) of step a) denotes the contribution of the variability in the STVEs towards the cumulative cross-term sensitivity while step iv) of a) denotes the contribution of variability in the intrinsic ST macro-model. Accounting for the variability from both the STVE(s) and the ST macro-model enables calculating the STQ accurately.

Cross term sensitivity $a_{ij}$ is a sensitivity of the STQ to linear variation sources $X_i$ and $X_j$, i.e., if linear variation source $X_i$ changes by some value and linear variation source $X_j$ changes by some value, STQ changes by the product of the change in the linear variation source $X_i$ and $X_j$ and the cross term sensitivity $a_{ij}$. The product $a_{ij}X_iX_j$ is referred to herein as a cross-term sensitivity contribution for each pair of cross term variation sources. In sub-step 23, each cross-term sensitivity contribution for each pair of variation sources can be calculated similarly, and then summed to arrive at a cumulative cross-term sensitivity contribution to the STQ. That is, $$\sum_{i=1}^{N-1} \sum_{j=i+1}^{N} a_{ij}X_iX_j.$$

In step S3 of the FIG. 10 embodiment, per Equation 3, STQ is calculated as the sum of the mean value contribution $\mu(s*, l*)$, all cumulative linear sensitivity contribution $$\sum_{i=1}^{N} a_iX_i,$$

and all cumulative cross-term sensitivity contribution $$\sum_{i=1}^{N-1} \sum_{j=i+1}^{N} a_{ij}X_iX_j.$$

In step S4, the STQ may be used similarly to that described relative to step S4 in FIG. 4.

Referring to FIG. 11, the present disclosure may be implemented as part of a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

To further illustrate, FIG. 11 is a block diagram of an illustrative processing system 101 in accordance with embodiments of the disclosure. System 101 is shown implemented on computer 102 as computer program code. To this extent, computer 102 is shown including a memory 112, a processor 114, an input/output (I/O) interface 116, and a bus 118. Further, computer 102 is shown in communication with an external I/O device/resource 120 and a storage system 122. In general, processor 114 executes computer program code, such as system 100, that is stored in memory 112 and/or storage system 122. While executing computer program code, processor 114 can read and/or write data to/from memory 112, storage system 122, and/or I/O device 120. Bus 118 provides a communication link between each of the components in computer 102, and I/O device 120 can comprise any device that enables user to interact with computer 102 (e.g., keyboard, pointing device, display, etc.).

Alternatively, a user can interact with another computing device (not shown) in communication with computer 102. In this case, I/O interface 116 can comprise any device that enables computer 102 to communicate with one or more other computing devices over a network (e.g., a network system, network adapter, I/O port, modem, etc.). The network can comprise any combination of various types of communications links. For example, the network can comprise addressable connections that may utilize any combination of wireline and/or wireless transmission methods. In this instance, the computing devices (e.g., computer 102) may utilize conventional network connectivity, such as Token Ring, Ethernet, WiFi or other conventional communications standards. Further, the network can comprise one or more of any type of network, including the Internet, a wide area network (WAN), a local area network (LAN), a virtual private network (VPN), etc. Where communications occur via the Internet, connectivity could be provided by conventional TCP/IP sockets-based protocol, and a computing device could utilize an Internet service provider to establish connectivity to the Internet.

Computer 102 is only representative of various possible combinations of hardware and software. For example, processor 114 may comprise a single processing unit, or be distributed across one or more processing units in one or more locations, e.g., on a client and server. Similarly, memory 112 and/or storage system 122 may reside at one or more physical locations. Memory 112 and/or storage system 122 can comprise any combination of various types of computer-readable media and/or transmission media including magnetic media, optical media, random access memory (RAM), read only memory (ROM), a data object, etc. I/O interface 116 can comprise any system for exchanging information with one or more I/O devices. Further, it is understood that one or more additional components (e.g., system software, math co-processor, etc.) not shown in FIG. 11 can be included in computer 102. To this extent, computer 102 can comprise any type of computing device such as a network server, a desktop computer, a laptop, a handheld device, a mobile phone, a pager, a personal data assistant, etc. However, if computer 102 comprises a handheld device or the like, it is understood that one or more I/O devices (e.g., a display) and/or storage system 122 could be contained within computer 102, not externally as shown.

System 101 may include a statistical timing analysis (STA) system 106 for implementing embodiments of the disclosure through various modules 140, e.g., calculators, etc., and/or other conventional statistical timing analysis functions. STA system 106 may interact with a design tool 142 which may include any now known or later developed IC design system for laying out, configuring, etc., an IC design 144.

Embodiments of the described disclosure increase accuracy and reduce computation run-time compared to an exhaustive finite differenced solution. Further, embodiments of the disclosure allow calculating a statistical timing quantity (e.g., delay) knowing large volume statistical entries (e.g., input slew and/or load) without having to create a table of all of the statistical entry and statistical output data by projecting to determine a statistical result. In addition, it allows for computation of statistical timing quantities such as statistical delay and statistical output slew that can be fed back for sue with upper level hierarchies.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of performing statistical timing analysis of a selected macro of an integrated circuit (IC) design using a statistical timing (ST) macro-model of the selected macro, the ST macro-model including statistical timing quantities as a function of deterministic timing value entries, each statistical timing quantity including a mean average contribution, and at least one of a linear sensitivity contribution and a cross-term sensitivity contribution, the method comprising:
    calculating a statistical timing quantity considering at least a given statistical timing value entry for the selected macro by:
    A) calculating a mean value contribution to the statistical timing quantity based on the mean average contributions of all statistical timing value entries, from the ST macro-model of the selected macro,
    B) calculating a cumulative linear sensitivity contribution to the statistical timing quantity for each of at least one linear variation source by summing a result of the following for each of the at least one variation source:
    first calculating a first projected value of at least one statistical timing value entry at a non-base corner of a selected linear variation source with all other linear variation sources at a respective base corner, and
    second calculating the linear sensitivity contribution to the statistical timing quantity for the selected linear variation source based on: a mean average contribution for the first projected value of the at least one statistical timing value entry from the ST macro-model, an intrinsic linear sensitivity for the first projected value for the selected linear variation from the ST macro-model and the mean value contribution to the statistical timing quantity;
    C) summing the mean value contribution and the cumulative linear sensitivity contribution to calculate the statistical timing quantity; and
    using the statistical timing quantity for statistical timing analysis and designing the IC.

2. The method of claim 1, wherein the given statistical timing value entry includes at least one of an input slew and an output load.

3. The method of claim 1, wherein the statistical timing quantity includes at least one of a delay, an output slew, and a test guard-time.

4. The method of claim 1, wherein the calculating the first projected value of the statistical timing quantity at the non-base corner value of the at least one linear variation source includes:
    summing a product of the non-base corner value and a linear sensitivity as a function of the selected linear variation source for the particular statistical timing value entry and a mean value of the statistical timing value entry for the selected linear variation source.

5. The method of claim 1, wherein the mean value contribution calculating includes:
    assigning the mean value contribution as the mean average contribution from the ST macro-model corresponding to a mean average of all of the statistical timing value entries from the ST macro-model of the selected macro.

6. The method of claim 1, wherein the second calculating of the linear sensitivity contribution includes:
    calculating the linear sensitivity to the statistical timing quantity for the selected linear variation source as the sum of: a) a dividend of a difference of the mean average contribution for the first projected value of the statistical timing value entry from the ST macro-model and the mean value contribution to the statistical timing quantity divided by a non-base corner value of the linear sensitivity contribution of the selected linear variation source, and b) the intrinsic linear sensitivity for the first projected value for the selected linear variation from the ST macro-model.

7. The method of claim 1, further comprising:
calculating a cumulative cross-term sensitivity contribution for each of at least one pair of cross-term variation sources to the statistical timing quantity by summing a result of the following for each of the at least one pair of cross-term variation sources:
 calculating a second projected value of at least one statistical timing value entry at non-base corners of a selected pair of cross-term variation sources with all other cross-term variation sources at a respective base corner,
 calculating the cross-term sensitivity contribution for the selected pair of cross-term variation sources as:
a) the sum of:
i) a dividend of a difference of a mean average contribution for the second projected value from the ST macro-model and the mean value contribution to the statistical timing quantity divided by a product of non-base corner values of each of the first variation source and the second variation source of the selected pair of cross-term variation sources at the second projected value of the selected cross-term variation source,
ii) a dividend of the intrinsic linear sensitivity of the first variation source of the selected cross-term variation source at the second projected value from the ST macro-model divided by a non-base corner value of the second variation source at the second projected value,
iii) a dividend of the intrinsic linear sensitivity of the second variation source of the selected pair of cross-term variation sources at the second projected value from the ST macro-model divided by a non-base corner value of the first variation source at the second projected value,
iv) an intrinsic cross-term sensitivity of the pair of cross-term variation sources at the second projected value from the ST macro-model,
b) minus:
i) a dividend of the linear sensitivity of the first linear variation source of the selected pair of cross-term variation sources from the ST macro-model divided by the non-base corner value of the second variation source at the second projected value, and
ii) a dividend of the linear sensitivity of the second linear variation source of the selected pair of cross-term variation sources from the ST macro-model divided by the non-base corner value of the first variation source at the second projected value, and
 wherein the first summing includes summing the mean value contribution, the cumulative linear sensitivity contribution and the cumulative cross-term sensitivity contribution to calculate the statistical timing quantity.

8. A system for performing statistical timing analysis of a selected macro of an integrated circuit (IC) design using a statistical timing (ST) macro-model of the selected macro, the ST macro-model including statistical timing quantities as a function of deterministic timing value entries, each statistical timing quantity including a mean average contribution, and at least one of a linear sensitivity contribution and a cross-term sensitivity contribution, the system comprising:
 a calculator calculating a statistical timing quantity considering at least a given statistical timing value entry for the selected macro by:
A) calculating a mean value contribution to the statistical timing quantity based on the mean average contributions of all statistical timing value entries from the ST macro-model of the selected macro,
B) calculating a cumulative linear sensitivity contribution to the statistical timing quantity for each of at least one linear variation source by summing a result of the following for each of the at least one variation source:
 first calculating a first projected value of at least one statistical timing value entry at a non-base corner of a selected linear variation source with all other linear variation sources at a respective base corner, and
 second calculating the linear sensitivity contribution to the statistical timing quantity for the selected linear variation source based on: a mean average contribution for the first projected value of the at least one statistical timing value entry from the ST macro-model, an intrinsic linear sensitivity for the first projected value for the selected linear variation from the ST macro-model and the mean value contribution to the statistical timing quantity;
C) summing the mean value contribution and the cumulative linear sensitivity contribution to calculate the statistical timing quantity; and
 an IC design system using the statistical timing quantity for designing the IC.

9. The system of claim 8, wherein the given statistical timing value entry includes at least one of an input slew and an output load.

10. The system of claim 8, wherein the statistical timing quantity includes at least one of a delay, an output slew and a test guard-time.

11. The system of claim 8, wherein the calculating the first projected value of the statistical timing quantity at the non-base corner value of the at least one linear variation source includes:
 summing a product of the non-base corner value and a linear sensitivity as a function of the selected linear variation source for the particular statistical timing value entry and a mean value of the statistical timing value entry for the selected linear variation source.

12. The system of claim 8, wherein the mean value contribution calculating includes:
 assigning the mean value contribution as the mean average contribution from the ST macro-model corresponding to a mean average of all of the statistical timing value entries from the ST macro-model of the selected macro.

13. The system of claim 8, wherein the second calculating of the linear sensitivity contribution includes:
 calculating the linear sensitivity to the statistical timing quantity for the selected linear variation source as the sum of: a) a dividend of a difference of the mean average contribution for the first projected value of the statistical timing value entry from the ST macro-model and the mean value contribution to the statistical timing quantity divided by a non-base corner value of the linear sensitivity contribution of the selected linear variation source, and b) the intrinsic linear sensitivity for the first projected value for the selected linear variation from the ST macro-model.

14. The system of claim 8, wherein the component calculator calculates the statistical timing quantity considering a given statistical timing value entry for the selected macro further by:
 calculating a cumulative cross-term sensitivity contribution for each of at least one pair of cross-term variation sources to the statistical timing quantity by summing a result of the following for each of the at least one pair of cross-term variation sources:
  calculating a second projected value of at least one statistical timing value entry at non-base corners of a selected pair of cross-term variation sources with all other cross-term variation sources at a respective base corner,
  calculating the cross-term sensitivity contribution for the selected pair of cross-term variation sources as:
  a) the sum of:
  i) a dividend of a difference of a mean average contribution for the second projected value from the ST macro-model and the mean value contribution to the statistical timing quantity divided by a product of non-base corner values of each of the first variation source and the second variation source of the selected pair of cross-term variation sources at the second projected value of the selected cross-term variation source,
  ii) a dividend of the intrinsic linear sensitivity of the first variation source of the selected cross-term variation source at the second projected value from the ST macro-model divided by a non-base corner value of the second variation source at the second projected value,
  iii) a dividend of the intrinsic linear sensitivity of the second variation source of the selected pair of cross-term variation sources at the second projected value from the ST macro-model divided by a non-base corner value of the first variation source at the second projected value,
  iv) an intrinsic cross-term sensitivity of the pair of cross-term variation sources at the second projected value from the ST macro-model,
  b) minus:
  i) a dividend of the linear sensitivity of the first linear variation source of the selected pair of cross-term variation sources from the ST macro-model divided by the non-base corner value of the second variation source at the second projected value, and
  ii) a dividend of the linear sensitivity of the second linear variation source of the selected pair of cross-term variation sources from the ST macro-model divided by the non-base corner value of the first variation source at the second projected value, and
  wherein the first summing includes summing the mean value contribution, the cumulative linear sensitivity contribution and the cumulative cross-term sensitivity contribution to calculate the statistical timing quantity.

15. A computer program product for performing statistical timing analysis of a selected macro of an integrated circuit (IC) design using a statistical timing (ST) macro-model of the selected macro, the ST macro-model including statistical timing quantities as a function of deterministic timing value entries, each statistical timing quantity including a mean average contribution, and at least one of a linear sensitivity contribution and a cross-term sensitivity contribution, the computer prc product comprising a computer readable age medium having program instructions embodied therewith, the program instructions executable by a processor to cause the processor to perform the following steps:
  calculating a statistical timing quantity considering at least a given statistical timing value entry for the selected macro by:
    A) calculating a mean value contribution to the statistical timing quantity based on the mean average contributions of all statistical timing value entries from the ST macro-model of the selected macro,
    B) calculating a cumulative linear sensitivity contribution to the statistical timing quantity for each of at least one linear variation source by summing a result of the following for each of the at least one variation source:
      first calculating a first projected value of at least one statistical timing value entry at a non-base corner of a selected linear variation source with all other linear variation sources at a respective base corner, and
      second calculating the linear sensitivity contribution to the statistical timing quantity for the selected linear variation source based on: a mean average contribution for the first projected value of the at least one statistical timing value entry from the ST macro-model, an intrinsic linear sensitivity for the first projected value for the selected linear variation from the ST macro-model and the mean value contribution to the statistical timing quantity;
    C) summing the mean value contribution and the cumulative linear sensitivity contribution to calculate the statistical timing quantity; and
  an IC design system using the statistical timing quantity for designing the IC.

16. The program product of claim 15, wherein the given statistical timing value entry includes at least one of an input slew and an output load, and the statistical timing quantity includes at least one of a delay, an output slew and a test guard-time.

17. The program product of claim 15, wherein the calculating the first projected value of the statistical timing quantity at the non-base corner value of the at least one linear variation source includes:
  summing a product of the non-base corner value and a linear sensitivity as a function of the selected linear variation source for the particular statistical timing value entry and a mean value of the statistical timing value entry for the selected linear variation source.

18. The program product of claim 15, wherein the mean value contribution calculating includes:
  assigning the mean value contribution as the mean average contribution from the ST macro-model corresponding to a mean average of all of the statistical timing value entries from the ST macro-model of the selected macro.

19. The program product of claim 15, wherein the second calculating of the linear sensitivity contribution includes:
  calculating the linear sensitivity to the statistical timing quantity for the selected linear variation source as the sum of: a) a dividend of a difference of the mean average contribution for the first projected value of the statistical timing value entry from the ST macro-model and the mean value contribution to the statistical timing quantity divided by a non-base corner value of the linear sensitivity contribution of the selected linear variation source, and b) the intrinsic linear sensitivity for the first projected value for the selected linear variation from the ST macro-model.

20. The program product of claim 15, wherein the calculating includes calculating the statistical timing quantity considering the given statistical timing value entry for the selected macro further by:
  calculating a cumulative cross-term sensitivity contribution for each of at least one pair of cross-term variation sources to the statistical timing quantity by summing a result of the following for each of the at least one pair of cross-term variation sources:
    calculating a second projected value of at least one statistical timing value entry at non-base corners of a selected pair of cross-term variation sources with all other cross-term variation sources at a respective base corner, calculating the cross-term sensitivity contribution for the selected pair of cross-term variation sources as:

a) the sum of:
i) a dividend of a difference of a mean average contribution for the second projected value from the ST macro-model and the mean value contribution to the statistical timing quantity divided by a product of non-base corner values of each of the first variation source and the second variation source of the selected pair of cross-term variation sources at the second projected value of the selected cross-term variation source,
ii) a dividend of the intrinsic linear sensitivity of the first variation source of the selected cross-term variation source at the second projected value from the ST macro-model divided by a non-base corner value of the second variation source at the second projected value,
iii) a dividend of the intrinsic linear sensitivity of the second variation source of the selected pair of cross-term variation sources at the second projected value from the ST macro-model divided by a non-base corner value of the first variation source at the second projected value,
iv) an intrinsic cross-term sensitivity of the pair of cross-term variation sources at the second projected value from the ST macro-model, b) minus:
i) a dividend of the linear sensitivity of the first linear variation source of the selected pair of cross-term variation sources from the ST macro-model divided by the non-base corner value of the second variation source at the second projected value, and
ii) a dividend of the linear sensitivity of the second linear variation source of the selected pair of cross-term variation sources from the ST macro-model divided by the non-base corner value of the first variation source at the second projected value, and wherein the first summing includes summing the mean value contribution, the cumulative linear sensitivity contribution and the cumulative cross-term sensitivity contribution to calculate the statistical timing quantity.

* * * * *